US012812473B2

(12) United States Patent
Hong

(10) Patent No.: US 12,812,473 B2
(45) Date of Patent: Nov. 24, 2026

(54) SERVICE FLOW PROCESSING METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 301 days.

(21) Appl. No.: 18/284,808

(22) PCT Filed: Apr. 2, 2021

(86) PCT No.: PCT/CN2021/085443
§ 371 (c)(1),
(2) Date: Sep. 28, 2023

(87) PCT Pub. No.: WO2022/205470
PCT Pub. Date: Oct. 6, 2022

(65) Prior Publication Data
US 2024/0179570 A1 May 30, 2024

(51) Int. Cl.
*H04W 28/10* (2009.01)

(52) U.S. Cl.
CPC .................................. *H04W 28/10* (2013.01)

(58) Field of Classification Search
CPC .. H04W 28/10; H04L 12/1407; H04L 43/028; H04L 41/0894; H04L 45/306
See application file for complete search history.

(56) References Cited

U.S. PATENT DOCUMENTS

2020/0252837 A1 8/2020 Kim et al.
2022/0210700 A1* 6/2022 Wu .................. H04W 28/0925
2024/0121309 A1* 4/2024 Muñoz De La Torre .................. H04L 69/14

FOREIGN PATENT DOCUMENTS

CN 111356207 A 6/2020
CN 112291777 A 1/2021
(Continued)

OTHER PUBLICATIONS

PCT/CN2021/085443, International Search Report dated Nov. 17, 2021, 2 pages.
(Continued)

*Primary Examiner* — Asad M Nawaz
*Assistant Examiner* — Najeeb Ansari
(74) *Attorney, Agent, or Firm* — Cozen O'Connor

(57) ABSTRACT

A traffic flow processing method by a network exposure function (NEF) network element includes receiving a traffic flow steering policy request sent by an application function (AF), wherein the traffic flow steering policy request is configured for the AF to provide traffic flow steering policy information to the NEF. A traffic flow processing method by a session management function (SMF) network element includes receiving traffic flow steering policy information sent by a network exposure function (NEF), wherein the traffic flow steering policy information is traffic flow steering policy information retrieved based on an application identifier, and performing one or more operations of adding, deleting, and modifying the traffic flow steering policy on an application program corresponding to the traffic flow steering policy information, based on the traffic flow steering policy information.

12 Claims, 11 Drawing Sheets

(56) References Cited

FOREIGN PATENT DOCUMENTS

| | | | |
|---|---|---|---|
| WO | WO 2021017621 | A1 | 2/2021 |
| WO | WO 2021051241 | A1 | 3/2021 |
| WO | WO 2021054747 | A1 | 3/2021 |

OTHER PUBLICATIONS

European Patent Application No. 21934126.0 Search Report dated Apr. 19, 2024, 15 pages.

3rd Generation Partnership Project "Policy and charging control framework for the 5G System(5GS); Stage 2 (Release16)" 3GPP TS 23.503, V16.8.0, Mar. 2021, 120 pages.

* cited by examiner

SERVICE FLOW PROCESSING METHOD

CROSS-REFERENCE TO RELATED APPLICATION

This application is a U.S. national phase application of International Patent Application No. PCT/CN2021/085443, filed on Apr. 2, 2021, the entire contents of which are incorporated herein by reference.

FIELD

The present disclosure relates to the technical field of wireless communication, and in particular to a traffic flow processing method, a traffic flow processing apparatus, and a storage medium.

BACKGROUND

For an end-to-end service in a wireless communication network, for example, a traffic flow is transported from a user equipment (UE) via a mobile network to a packet data network, e.g. Internet. For mobile network operators, in a process of the traffic flow being transported from the UE via the mobile network to the packet data network, there are, e.g., a firewall function, a network address translation (NAT), a uniform resource locator system (URL) filter, a lawful inspection (LI), a deep packet inspection (DPI), an Internet protocol (IP) tunnel endpoint, a packet classifier, an application detection and control (ADC), a transmission control protocol (TCP) proxy, KPI monitoring, a load balancer, a transcoder, an application policy control, a protocol and video optimization, etc., in the network. Therefore, a large number of middle boxes, such as a combination of IP-based service functions, are required to perform middle box processing on the traffic flow. However, the middle box processing of the traffic flow needed to be performed in a network area between the mobile network and the Internet, so as to provide enhanced security and various value-added services using unique capabilities.

In related technologies, different value-added services are provided through different traffic flow steering policies. Service functions and service function paths supported by the different traffic flow steering policies are different, so the different value-added services may be provided. However, the different traffic flow steering policies are pre-configured, which prevents a third party from dynamically managing traffic flow steering policy information. In other works, the third party cannot dynamically managing the service functions and the service function paths.

SUMMARY

According to a first aspect of an embodiment of the present disclosure, there is a traffic flow processing method. The method is applied to an application function (AF) network element. The method includes sending a traffic flow steering policy request to a network exposure function (NEF), in which the traffic flow steering policy request is configured to provide traffic flow steering policy information.

According to a second aspect of an embodiment of the present disclosure, there is provided a traffic flow processing method. The method is applied to a network exposure function (NEF) network element. The method includes receiving a traffic flow steering policy request sent by an application function (AF), in which the traffic flow steering policy request is configured for the AF to provide traffic flow steering policy information to the NEF.

According to a third aspect of an embodiment of the present disclosure, there is provided a traffic flow processing method. The method is applied to a unified data repository (UDR) network element. The method includes receiving a data storage request sent by a network exposure function (NEF), in which the data storage request is configured for requesting to store traffic flow steering policy information in the UDR network element, and storing the traffic flow steering policy information, in which the UDR storing the traffic flow steering policy information includes one or more operations of adding, deleting, and modifying.

According to a fourth aspect of an embodiment of the present disclosure, there is provided a traffic flow processing method. The method is applied to a session management function (SMF) network element. The method includes receiving traffic flow steering policy information sent by a network exposure function (NEF), in which the traffic flow steering policy information is traffic flow steering policy information retrieved based on an application identifier, and performing one or more operations of adding, deleting, and modifying the traffic flow steering policy on an application program corresponding to the traffic flow steering policy information, based on the traffic flow steering policy information.

According to a fifth aspect of an embodiment of the present disclosure, there is provided a traffic flow processing method. The method is applied to a user plane function (UPF) network element. The method includes receiving a traffic flow steering policy information management request sent by a session management function (SMF), in which the traffic flow steering policy information management request is configured to provide traffic flow steering policy information, and performing one or more operations of adding, deleting, and modifying the traffic flow steering policy on an application program corresponding to the traffic flow steering policy information, based on the traffic flow steering policy information management request.

It is to be understood that the foregoing general description and the following detailed description are illustrative and explanatory merely and are not restrictive of the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

In order to overcome problems existing in related technologies, the present disclosure provides a traffic flow processing method, a traffic flow processing apparatus, and a storage medium.

Figure 1:
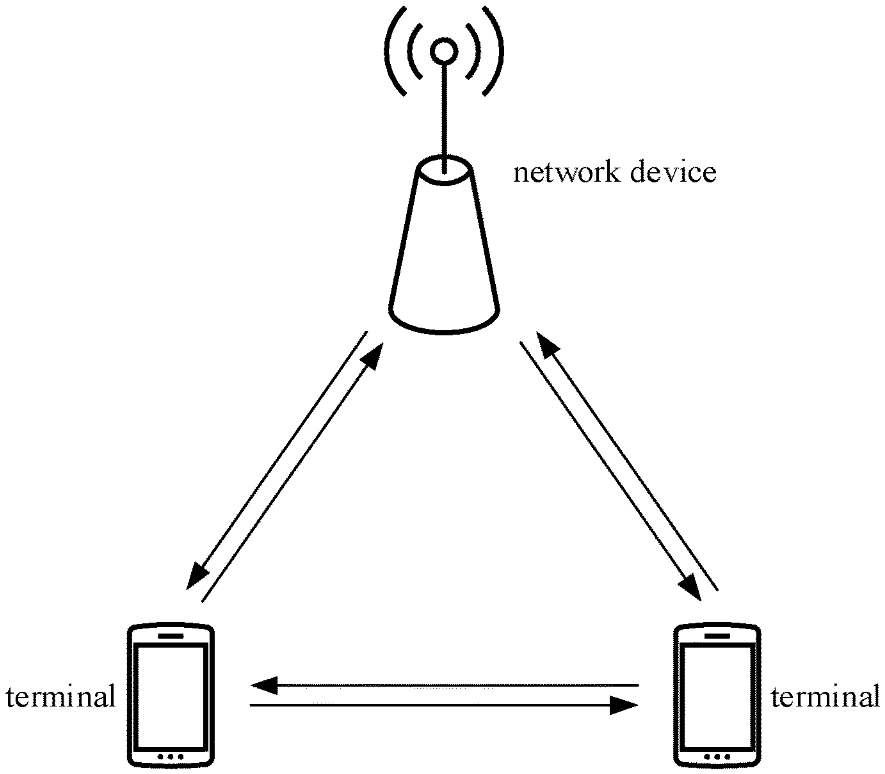
FIG. 1 is an architectural diagram showing a communication system between a network device and a terminal according to an illustrative embodiment.

FIG. 1 is an architectural diagram showing a communication system between a network device and a terminal according to an illustrative embodiment. A communication method provided in the present disclosure may be applied to a communication system architecture diagram shown in FIG. 1. As shown in FIG. 1, a network side device may send a signaling based on an architecture shown in FIG. 1.

It may be understood that the communication system between the network device and the terminal shown in FIG. 1 is merely a schematic illustration. A wireless communication system may also include other network devices, such as a core network device, a wireless relay device, and a wireless backhaul device, which are not shown in FIG. 1. An embodiment of the present disclosure does not limit the number of network devices and terminals included in the wireless communication system.

It may be further understood that the wireless communication system according to the embodiment of the present disclosure is a network that provides a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), carrier sense multiple access with collision avoidance. According to the capacity, speed, delay and other factors of different networks, the network may be divided into a $2^{nd}$ generation (2G) network, a 3G network, a 4G network or a future evolution network, such as a 5G network, the 5G network may also be referred to as a new radio (NR). For convenience of description, the wireless communication network is sometimes referred to as a network in the present disclosure.

Further, the network device involved in the present disclosure may also be referred to as a wireless access network device. The wireless access network device may be a base station, an evolved node B, a home base station, an access point (AP) in a wireless fidelity (WIFI) system, a wireless relay A node, a wireless backhaul node, a transmission point (TP), a transmission and reception point (TRP), etc., and it may also be a gNB in an NR system, or it may also be a component or part of device that constitutes a base station. When it is a vehicle to everything (V2X) communication system, the network device may also be an in-vehicle device. It is to be understood that in the embodiment of the present disclosure, a specific technology and a specific device form adopted by the network device are not limited.

Further, the terminal involved in the present disclosure may also be referred to as a terminal device, a user equipment (UE), a mobile station (MS), a mobile terminal (MT), etc. It is a device that provides voice and/or data connectivity to a user. For example, the terminal may be a handheld device with a wireless connection function, an in-vehicle device, etc. At present, some examples of terminals are a mobile phone, a pocket personal computer (PPC), a palmtop computer, a personal digital assistant (PDA), a notebook computer, a tablet computer, a wearable device, or an in-vehicle device. In addition, when it is a vehicle to everything (V2X) communication system, the terminal device may also be an in-vehicle device. It is to be understood that a specific technology and a specific device adopted by the terminal are not limited in the embodiment of the present disclosure.

Figure 2:
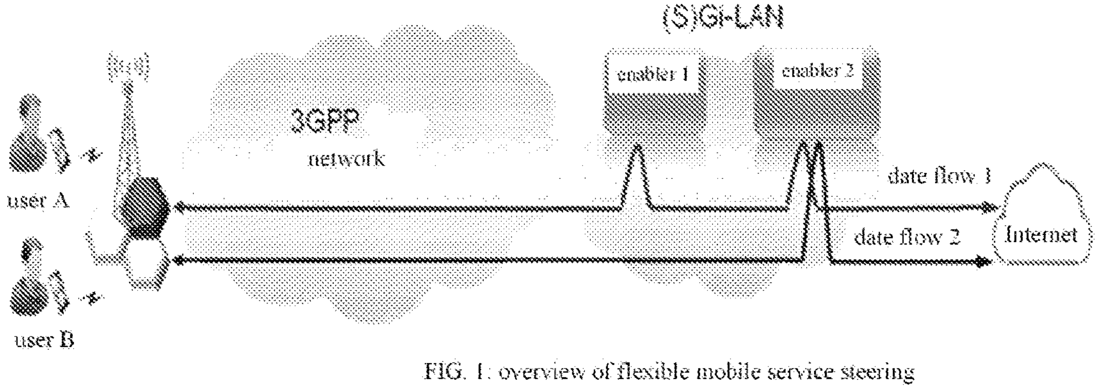
FIG. 2 is a schematic diagram showing an overview of a flexible mobile service steering according to an illustrative embodiment.

For an end-to-end service, referring to FIG. 2, FIG. 2 is a schematic diagram showing an overview of a flexible mobile service steering according to an illustrative embodiment. For example, a traffic flow is transported from a user equipment (UE) via a mobile network to a packet data network, e.g. Internet. For mobile network operators, in a process of the traffic flow being transported from the UE via the mobile network to the packet data network, there are, e.g., a firewall function, a network address translation (NAT), a uniform resource locator system (URL) filter, a lawful inspection (LI), a deep packet inspection (DPI), an Internet protocol (IP) tunnel endpoint, a packet classifier, an application detection and control (ADC), a transmission control protocol (TCP) proxy, KPI monitoring, a load balancer, a transcoder, an application policy control, a protocol and video optimization, etc., in the network. Therefore, a large number of middle boxes, such as a combination of IP-based service functions, is required to perform middle box processing on the traffic flow. However, the middle box processing the traffic flow needed to be performed in a network area between the mobile network and the Internet, so as to provide enhanced security and various value-added services using unique capabilities.

In a $3^{rd}$ generation partnership project (3GPP), it is proposed to support for service function chaining in a new generation communication technology, for example, service functions and service function paths; service configurations and a managements support of service functions and service function paths to third parties for applications and their users with value-added services, e.g. provided by 5GS only or both of 5GS and $3^{rd}$ parties; continuing same value-added service experience for UEs using 5G services, e.g. an enhanced mobile broadbande (eMBB), a vehicle to everything (V2X), AVPROD, NCIS, etc., and moving between networks.

Their solutions are defined in TS23.503 in the related technologies, including that a traffic controlling is triggered by a policy control function (PCF) initiated request and consists of controlling a detected service traffic flow matching application detection filters or service traffic flow filter(s) in a policy and charging control (PCC) rule. It may be understood that the traffic controlling consists in diverting traffic matching traffic filters provided by the PCF, as described in TS 23.501 [2] clause 5.6.7.

In the related technologies, a specific N6 traffic controlling policy is applied to control the subscriber's traffic to an appropriated N6 service function deployed by an operator or a third party service provider.

The PCF uses one or more pieces of information, such as network operator's policies, a user subscription, user's oracle real application testing (RAT), a network load status, an application identifier, time of day, a UE location, DNN (related to a subscriber session and an application traffic), as input for selecting a traffic flow steering policy.

The PCF controls traffic controlling by configuring and modifying traffic controlling information in the PCC rule. The traffic controlling information consists of a traffic description and a reference to a traffic controlling policy that is configured in a session management function (SMF). As described below, the specific N6 traffic controlling policy is applied to control the subscriber's traffic to the appropriated N6 service function deployed by the operator or the third party service provider.

The PCF uses the one or more pieces of information, such as the network operator's policies, the user subscription, the user's oracle real application testing (RAT), the network load status, the application identifier, the time of day, the UE location, the DNN (related to the subscriber session and the application traffic), as input for selecting the traffic flow steering policy.

The PCF controls the traffic controlling by configuring and modifying the traffic controlling information in the PCC rule. The traffic controlling information consists of the traffic description and the reference to the traffic controlling policy that is configured in the SMF.

The SMF instructs a user plane function (UPF) to perform necessary actions to enforce the traffic controlling policy referenced by the PCF. An actual traffic flow steering applies at the UPF. In order to implement a redirection policy, the UPF may support functions related to traffic flow redirection as defined by other standard organizations. The mechanism used for routing the traffic over N6 is out of 3GPP scope.

In the related technologies, the content of a traffic steering policy is pre-configured in the SMF, which prevents a third party AS from dynamically updating the service functions and the service function paths for its application.

Therefore, the present disclosure provides a traffic flow processing method, which may delete, modify and add the content of the traffic steering policy. The flexible management of N6 LAN traffic controlling policy is realized.

Figure 3:
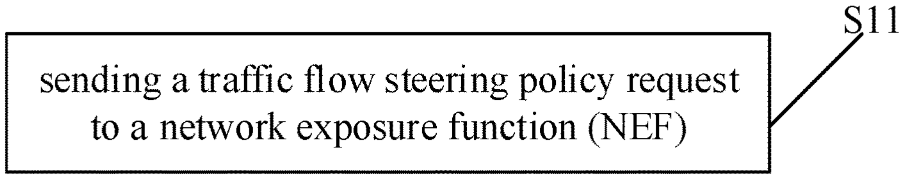
FIG. 3 is a flow chart showing a traffic flow processing method applied to an application function (AF) network element according to an illustrative embodiment.

FIG. 3 is a flow chart showing a traffic flow processing method according to an illustrative embodiment. As shown in FIG. 3, the method is applied to an application function (AF) network element and includes a step as follows.

In step S11, a traffic flow steering policy request is sent to a network exposure function (NEF).

In an embodiment of the present disclosure, the traffic flow steering policy request is configured to provide traffic flow steering policy information. The traffic flow steering policy information may be a service function and a service function path of a third party application. The third party application sends the traffic flow steering policy request to the NEF through the AF, and requests to manage the service function and service function path for its application. The management includes one or more of deletion, update and addition.

Figure 4:
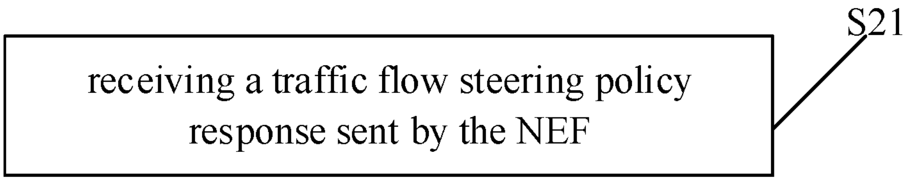
FIG. 4 is a flow chart showing a traffic flow processing method according to an illustrative embodiment.

FIG. 4 is a flow chart showing a traffic flow processing method according to an illustrative embodiment. As shown in FIG. 4, the method is applied to an application function (AF) network element and includes a step as follows.

In step S21, a traffic flow steering policy response sent by the NEF is received.

In an embodiment of the present disclosure, the traffic flow steering policy response includes an application identifier corresponding to the traffic flow steering policy information, and the application identifier is configured for determining to store the traffic flow steering policy information in a unified data repository (UDR). After receiving the traffic flow steering policy request sent by the AF, the NEF stores the traffic flow steering policy information in the traffic flow steering policy request in the UDR, and sends the traffic flow steering policy response to the AF to inform the AF that the traffic flow steering policy information is stored in the UDR.

Based on the same/similar concept, an embodiment of the present disclosure also provides a traffic flow processing method.

Figure 5:
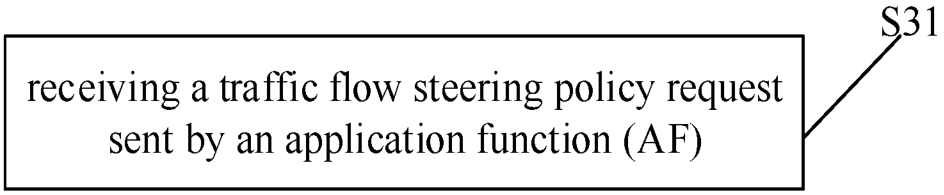
FIG. 5 is a flow chart showing a traffic flow processing method applied to a network exposure function (NEF) network element according to an illustrative embodiment.

FIG. 5 is a flow chart showing a traffic flow processing method according to an illustrative embodiment. As shown in FIG. 5, the method is applied to a network exposure function (NEF) network element and includes a step as follows.

In step S31, a traffic flow steering policy request sent by an application function (AF) is received.

In an embodiment of the present disclosure, as mentioned above, the traffic flow steering policy information may be the service function and the service function path of the third party application.

Figure 6:
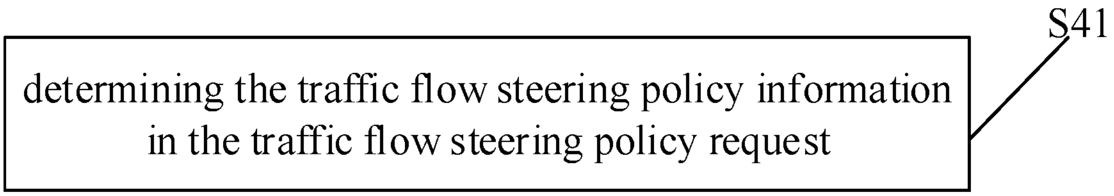
FIG. 6 is a flow chart showing a traffic flow processing method according to an illustrative embodiment.

FIG. 6 is a flow chart showing a traffic flow processing method according to an illustrative embodiment. As shown in FIG. 6, the method is applied to a network exposure function (NEF) network element and includes a step as follows.

In step S41, the traffic flow steering policy information in the traffic flow steering policy request is determined.

In an embodiment of the present disclosure, the NEF determines, according to a received traffic flow steering policy request, that its application provides the traffic flow steering policy information. That is, it is determined to manage the service function and service function path for its application. The management includes one or more of deletion, update and addition.

Figure 7:
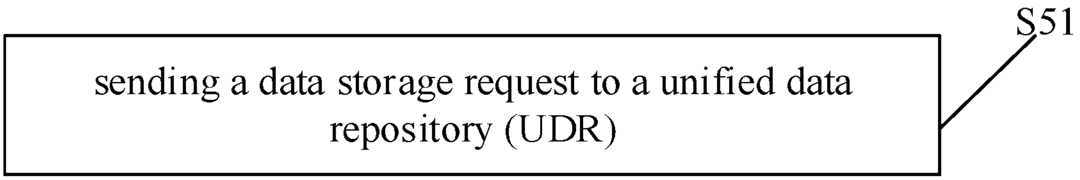
FIG. 7 is a flow chart showing a traffic flow processing method according to an illustrative embodiment.

FIG. 7 is a flow chart showing a traffic flow processing method according to an illustrative embodiment. As shown in FIG. 7, the method is applied to a network exposure function (NEF) network element and includes a step as follows.

In step S51, a data storage request is sent to a unified data repository (UDR).

In an embodiment of the present disclosure, the data storage request is configured for requesting to store the traffic flow steering policy information in the UDR, in which the UDR storing the traffic flow steering policy information includes one or more operations of adding, deleting, and modifying.

Figure 8:
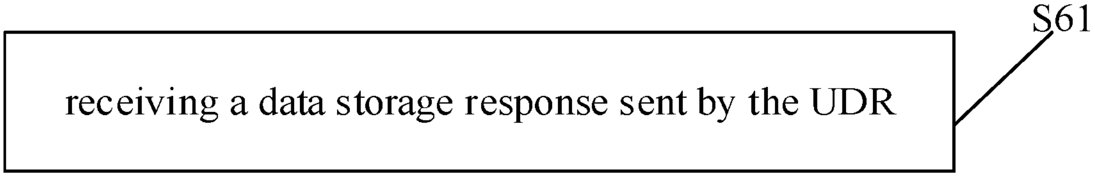
FIG. 8 is a flow chart showing a traffic flow processing method according to an illustrative embodiment.

FIG. 8 is a flow chart showing a traffic flow processing method according to an illustrative embodiment. As shown in FIG. 8, the method is applied to a network exposure function (NEF) network element and includes a step as follows.

In step S61, a data storage response sent by the UDR is received.

Figure 9:
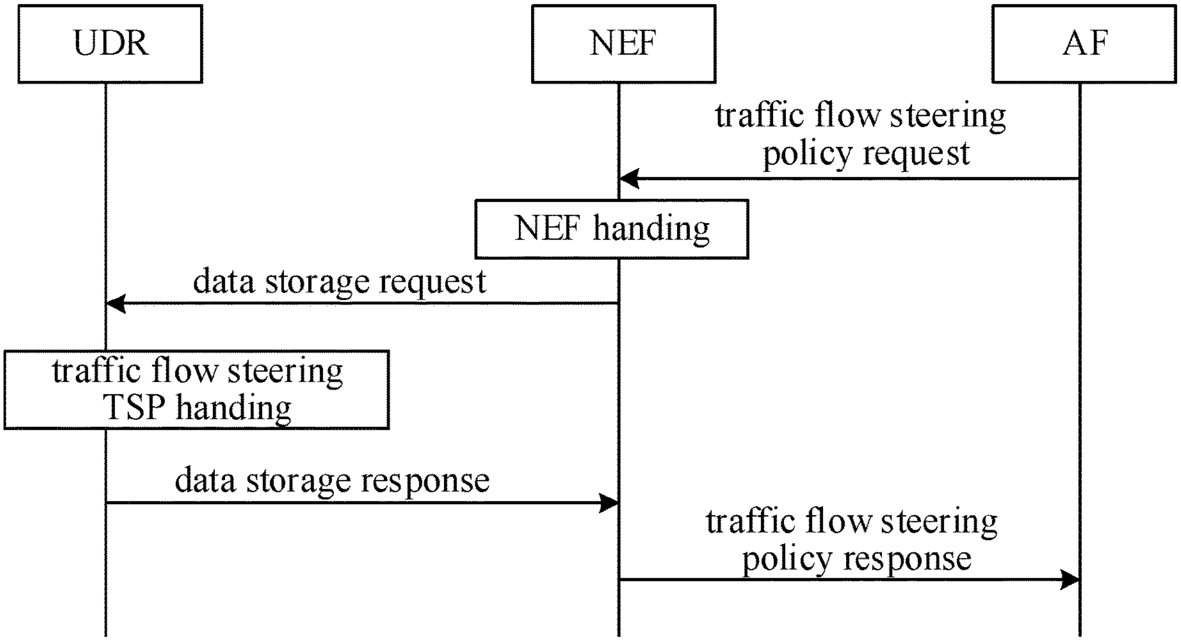
FIG. 9 is a flow chart showing a method for storing traffic flow steering policy information according to an illustrative embodiment.

In an embodiment of the present disclosure, the data storage response is configured to indicate that the traffic flow steering policy information is stored in the UDR. FIG. 9 is a flow chart showing a method for storing traffic flow steering policy information according to an illustrative embodiment. As shown in FIG. 9, the AF sends the traffic flow steering policy request (the AF invokes the Nnef_N6LANTSPManagement_Create/Update/Delete service) to the NEF. The NEF processes the traffic flow steering policy request and determines the traffic flow steering policy information. The data storage request is sent to the UDR. After receiving the data storage request, the UDR performs N6LANTSP processing and the data storage response is sent to the NEF. After receiving the data storage response, the NEF sends the traffic flow steering policy response to the AF.

Figure 10:
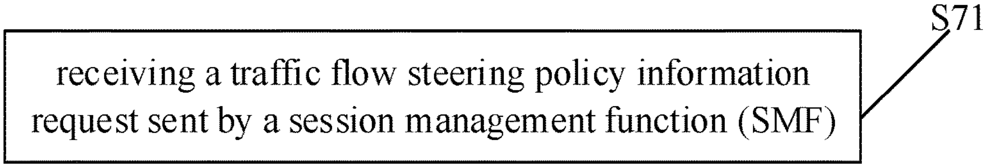
FIG. 10 is a flow chart showing a traffic flow processing method applied to a network exposure function (NEF) network element according to an illustrative embodiment.

FIG. 10 is a flow chart showing a traffic flow processing method according to an illustrative embodiment. As shown in FIG. 10, the method is applied to a network exposure function (NEF) network element and includes a step as follows.

In step S71, a traffic flow steering policy information request sent by a session management function (SMF) is received.

In an embodiment of the present disclosure, the traffic flow steering policy information request is configured for the SMF to acquire the traffic flow steering policy information retrieved based on an application identifier from the NEF. The NEF receives the traffic flow steering policy information request sent by the SMF, and retrieves the traffic flow steering policy information from the UDR. N6 LAN traffic flow steering policy information retrieved for the application identifier from the NEF is cached in the SMF, and the SMF maintains a caching timer associated with the N6 LAN traffic flow steering policy information to control the time when the N6 LAN traffic controlling policy information is valid.

Figure 11:
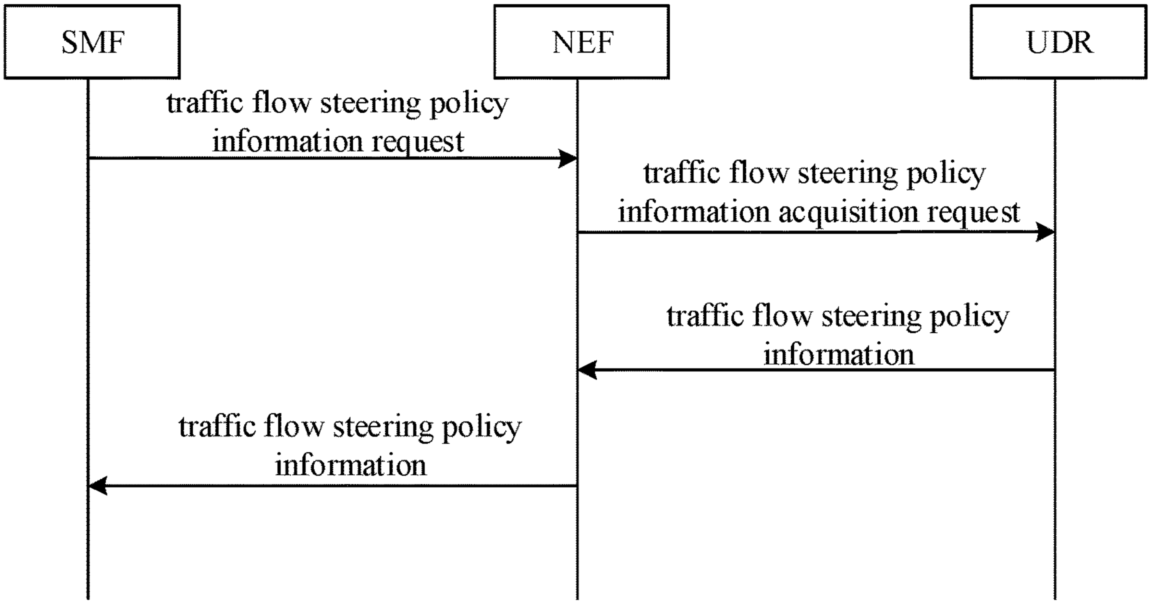
FIG. 11 is a flow chart showing a method for retrieving traffic flow steering policy information according to an illustrative embodiment.

FIG. 11 is a flow chart showing a method for retrieving traffic flow steering policy information according to an illustrative embodiment. The method includes steps as follows.

Figure 12:
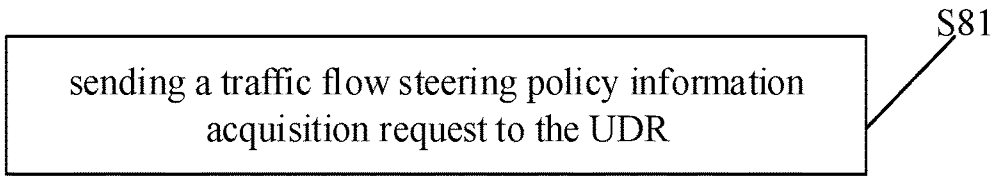
FIG. 12 is a flow chart showing a traffic flow processing method according to an illustrative embodiment.

FIG. 12 is a flow chart showing a traffic flow processing method according to an illustrative embodiment. As shown in FIG. 12, the method is applied to a network exposure function (NEF) network element and includes a step as follows.

In step S81, a traffic flow steering policy information acquisition request is sent to the UDR.

In an embodiment of the present disclosure, the traffic flow steering policy information acquisition request is configured to acquire the traffic flow steering policy information. The NEF checks whether the traffic flow steering policy information retrieved based on the application identifier is available in the NEF. If available, the NEF sends the traffic flow steering policy information to the SMF. If not, the NEF invokes the application identifier (Nudr_DM_Query) to retrieve the traffic flow steering policy information from the UDR.

The NEF retrieves the traffic flow steering policy information for each application identifier from the UDR and distributes it to a SMF that enable access to those applications. The NEF may be configured with the list of SMFs where service functions and service function paths should be distributed.

Figure 13:
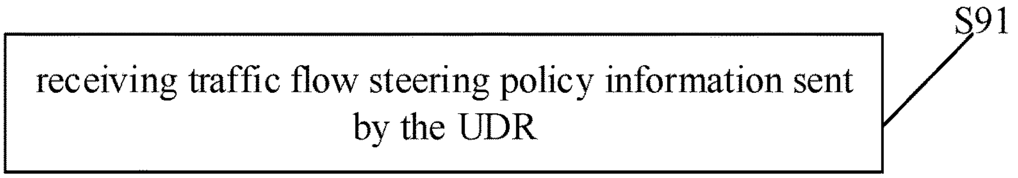
FIG. 13 is a flow chart showing a traffic flow processing method according to an illustrative embodiment.

FIG. 13 is a flow chart showing a traffic flow processing method according to an illustrative embodiment. As shown in FIG. 13, the method is applied to a network exposure function (NEF) network element and includes a step as follows.

In step S91, traffic flow steering policy information sent by the UDR is received.

In an embodiment of the present disclosure, the traffic flow steering policy information is the traffic flow steering policy information retrieved based on the application identifier. The UDR provides a traffic flow steering policy information (Nudr_DM_Query) response to the NEF. The traffic flow steering policy information response includes the traffic flow steering policy information.

Figure 14:
FIG. 14 is a flow chart showing a traffic flow processing method according to an illustrative embodiment.

FIG. 14 is a flow chart showing a traffic flow processing method according to an illustrative embodiment. As shown in FIG. 14, the method is applied to a network exposure function (NEF) network element and includes a step as follows.

In step S101, traffic flow steering policy information is sent to the SMF.

In an embodiment of the present disclosure, the traffic flow steering policy information is the traffic flow steering policy information retrieved based on the application identifier. The NEF replies to the SMF with the application identifier and traffic flow steering policy information (Nnef_N6LANTSPManagement_Fetch) (for example, N6LANTSP).

Based on the same/similar concept, an embodiment of the present disclosure also provides a traffic flow processing method.

Figure 15:
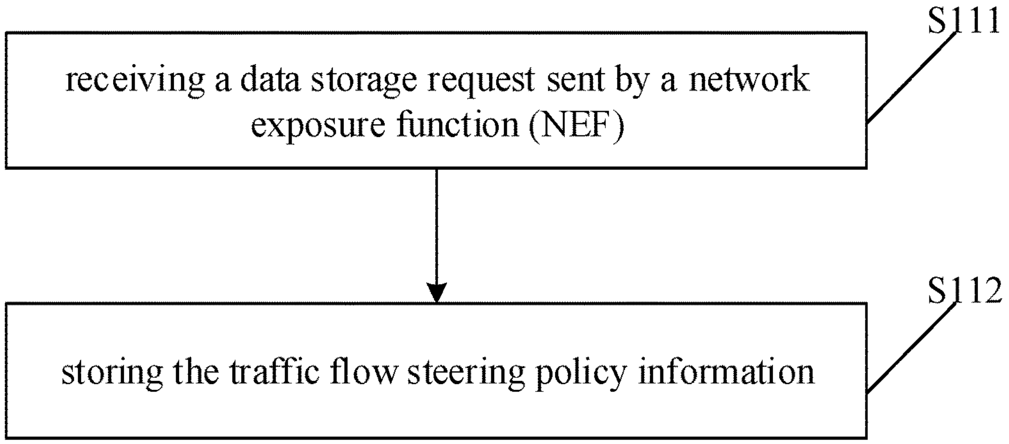
FIG. 15 is a flow chart showing a traffic flow processing method applied to a unified data repository (UDR) network element according to an illustrative embodiment.

FIG. 15 is a flow chart showing a traffic flow processing method according to an illustrative embodiment. As shown in FIG. 15, the method is applied to a unified data repository (UDR) network element and includes steps as follows.

In step S111, a data storage request sent by a network exposure function (NEF) is received.

In step S112, the traffic flow steering policy information is stored.

In an embodiment of the present disclosure, the data storage request is configured for requesting to store traffic flow steering policy information in the UDR network element, in which the UDR storing the traffic flow steering policy information includes one or more operations of adding, deleting, and modifying.

Figure 16:
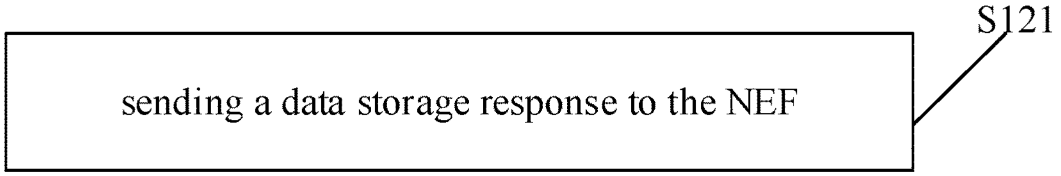
FIG. 16 is a flow chart showing a traffic flow processing method according to an illustrative embodiment.

FIG. 16 is a flow chart showing a traffic flow processing method according to an illustrative embodiment. As shown in FIG. 16, the method is applied to a unified data repository (UDR) network element and includes a step as follows.

In step S121, a data storage response is sent to the NEF.

In an embodiment of the present disclosure, the data storage response is configured to indicate that the traffic flow steering policy information is stored in the UDR network element.

Figure 17:
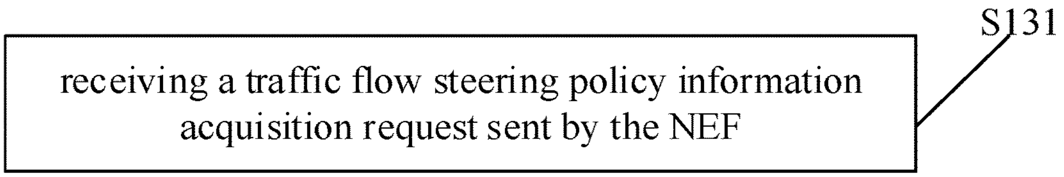
FIG. 17 is a flow chart showing a traffic flow processing method according to an illustrative embodiment.

FIG. 17 is a flow chart showing a traffic flow processing method according to an illustrative embodiment. As shown in FIG. 17, the method is applied to a unified data repository (UDR) network element and includes a step as follows.

In step S131, a traffic flow steering policy information acquisition request sent by the NEF is received.

In an embodiment of the present disclosure, the traffic flow steering policy information acquisition request is configured to acquire the traffic flow steering policy information.

Figure 18:
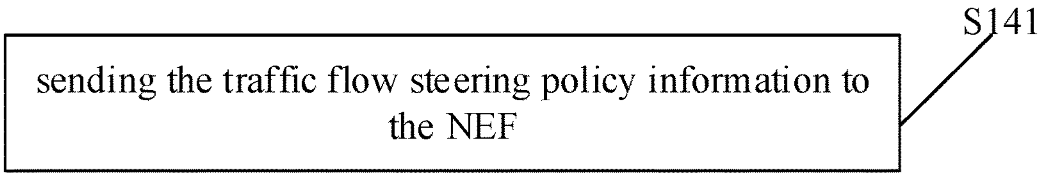
FIG. 18 is a flow chart showing a traffic flow processing method according to an illustrative embodiment.

FIG. 18 is a flow chart showing a traffic flow processing method according to an illustrative embodiment. As shown in FIG. 18, the method is applied to a unified data repository (UDR) network element and includes a step as follows.

In step S141, the traffic flow steering policy information is sent to the NEF.

In an embodiment of the present disclosure, the traffic flow steering policy information is traffic flow steering policy information retrieved based on an application identifier.

Based on the same/similar concept, an embodiment of the present disclosure also provides a traffic flow processing method.

Figure 19:
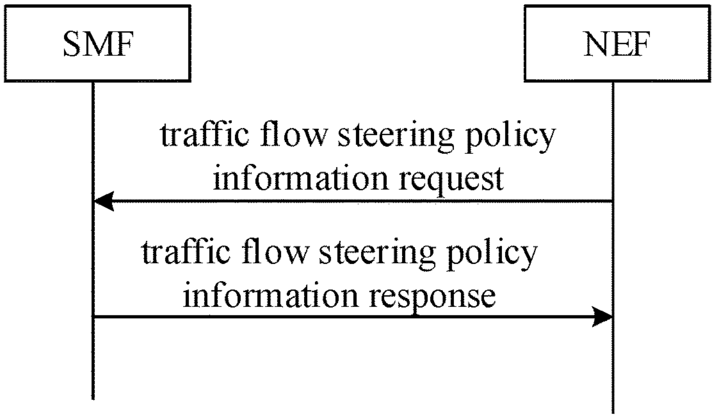
FIG. 19 is a flow chart showing a method for managing traffic flow steering policy information according to an illustrative embodiment.

FIG. 19 is a flow chart showing a method for managing traffic flow steering policy information according to an illustrative embodiment. The method includes steps as follows.

Figure 20:
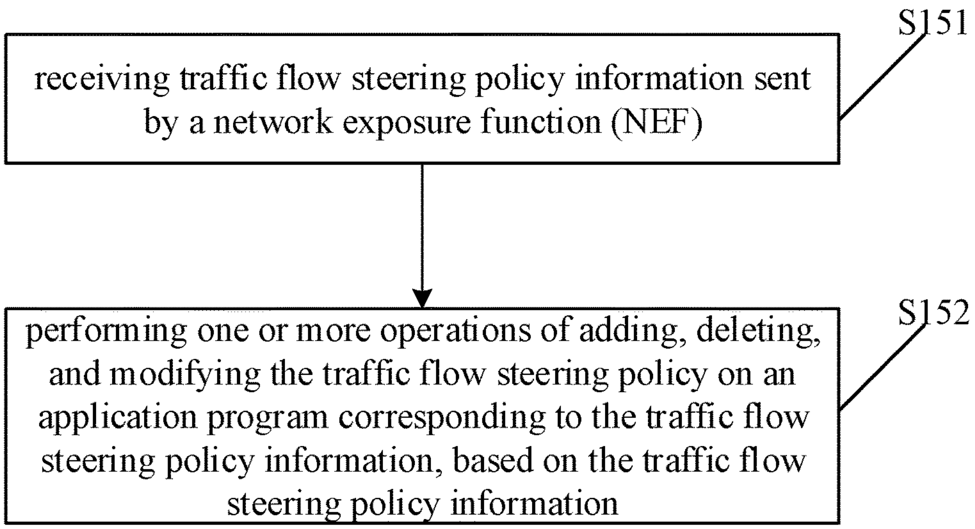
FIG. 20 is a flow chart showing a traffic flow processing method applied to a session management function (SMF) network element according to an illustrative embodiment.

FIG. 20 is a flow chart showing a traffic flow processing method according to an illustrative embodiment. As shown in FIG. 20, the method is applied to a session management function (SMF) network element and includes steps as follows.

In step S151, traffic flow steering policy information sent by a network exposure function (NEF) is received.

In step S152, one or more operations of adding, deleting, and modifying the traffic flow steering policy are performed on an application program corresponding to the traffic flow steering policy information, based on the traffic flow steering policy information.

In an embodiment of the present disclosure, the traffic flow steering policy information is traffic flow steering policy information retrieved based on an application identifier. The NEF invokes the application identifier, traffic flow steering policy information (such as N6LANTSP) and a N6LANTSP operation (Nnef_N6LANTSP_Management_Notify) to the SMF to which the traffic steering policy information shall be provided.

Figure 21:
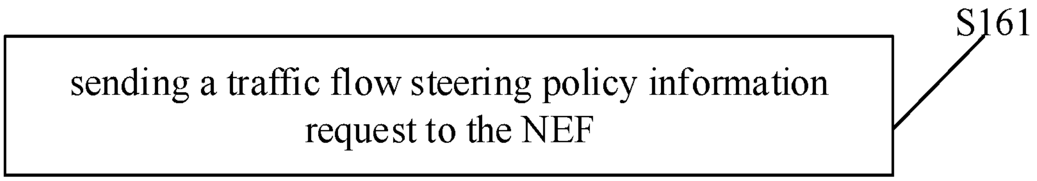
FIG. 21 is a flow chart showing a traffic flow processing method according to an illustrative embodiment.

FIG. 21 is a flow chart showing a traffic flow processing method according to an illustrative embodiment. As shown in FIG. 21, the method is applied to a session management function (SMF) network element and includes a step as follows.

In step S161, a traffic flow steering policy information request is sent to the NEF.

In an embodiment of the present disclosure, the traffic flow steering policy information request is configured to acquire the traffic flow steering policy information retrieved based on the application identifier from the NEF.

In an embodiment of the present disclosure, a set of traffic flow steering policy information is sent in at least one of following cases: determining that a cache counter expires and a user plane function (UPF) has not applied the traffic flow steering policy information, the UPF having no traffic flow steering policy information, and determining that the NEF has received a traffic flow steering policy request sent by an application function (AF).

This process enables the SMF to retrieve the traffic steering policy information from the NEF when a PCC rule with this application identifier are provided/activated and the traffic steering policy information provided by the NEF is not available at the SMF. In addition, this process enables the SMF to retrieve the traffic steering policy information from the NEF when the caching timer for the application identifier elapses and the PCC rule for this application identifier is still active. The NEF retrieves the traffic steering policy information from the UDR unless already available in the NEF.

Figure 22:
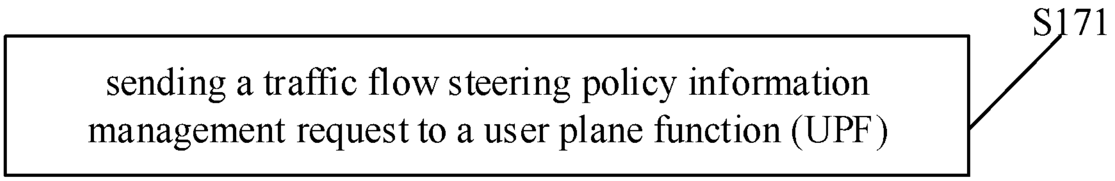
FIG. 22 is a flow chart showing a traffic flow processing method according to an illustrative embodiment.

FIG. 22 is a flow chart showing a traffic flow processing method according to an illustrative embodiment. As shown in FIG. 22, the method is applied to a session management function (SMF) network element and includes a step as follows.

In step S171, a traffic flow steering strategy information management request is sent to a user plane function (UPF).

In an embodiment of the present disclosure, the traffic flow steering policy information management request is configured to provide the traffic flow steering policy information. In an embodiment of the present disclosure, a N6 LAN traffic controlling policy includes information used for packet marking: N6 LAN traffic controlling policy identifier, a list of service functions with their IP address(s), and the order of service function.

The N6 LAN traffic controlling policy is stored in the UDR as data set "application data" and data subset "N6 LAN traffic controlling policy" with data key "application ID".

Figure 23:
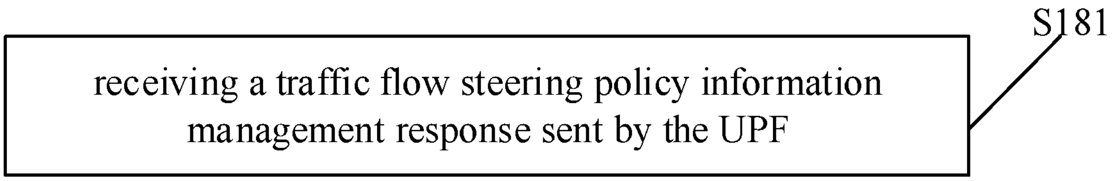
FIG. 23 is a flow chart showing a traffic flow processing method according to an illustrative embodiment.

FIG. 23 is a flow chart showing a traffic flow processing method according to an illustrative embodiment. As shown in FIG. 23, the method is applied to a session management function (SMF) network element and includes a step as follows.

In step S181, a traffic flow steering policy information management response sent by the UPF is received.

Figure 24:
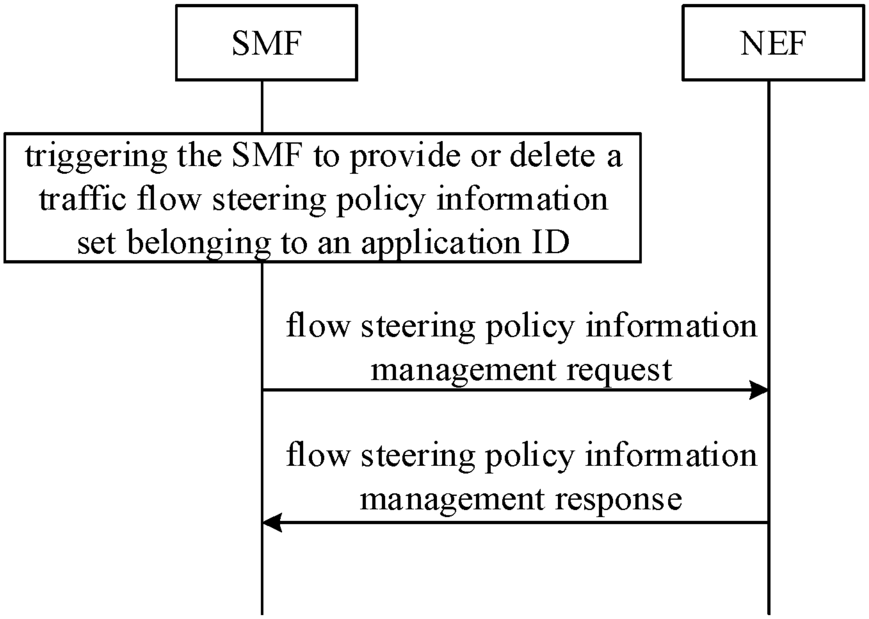
FIG. 24 is a flow chart showing a method for managing traffic flow steering policy information according to an illustrative embodiment.

In an embodiment of the present disclosure, the traffic flow steering policy information management response is configured to indicate that a management operation has been performed on the traffic flow steering policy information. FIG. 24 is a flow chart showing a method for managing traffic flow steering policy information according to an illustrative embodiment. The SMF is triggered to provide or delete a traffic flow steering policy information set belonging to an application ID. When a caching timer expires and there's no active PCC rule that refers to a corresponding application identifier, the SMF informs the UPF to delete the traffic flow steering policy information identified by the application ID. When a PCC rule is provided for an application ID corresponding to N6LANTSP(s) that are not already provided to the UPF, the SMF shall provide the traffic flow steering policy information to the UPF (in case that there are no traffic flow steering policy information cached, the SMF retrieves them from the NEF. When any update of the traffic flow steering policy information is received from the NEF, and there are still active PCC rules in UPF for the application ID. The SMF sends the traffic flow steering policy information management request to the UPF to provide/delete the traffic flow steering policy information corresponding to the application ID. The UPF updates the traffic flow steering policy information according to the request and acknowledges by responding with the traffic flow steering policy information management response message.

Based on the same/similar concept, an embodiment of the present disclosure also provides a traffic flow processing method.

Figure 25:
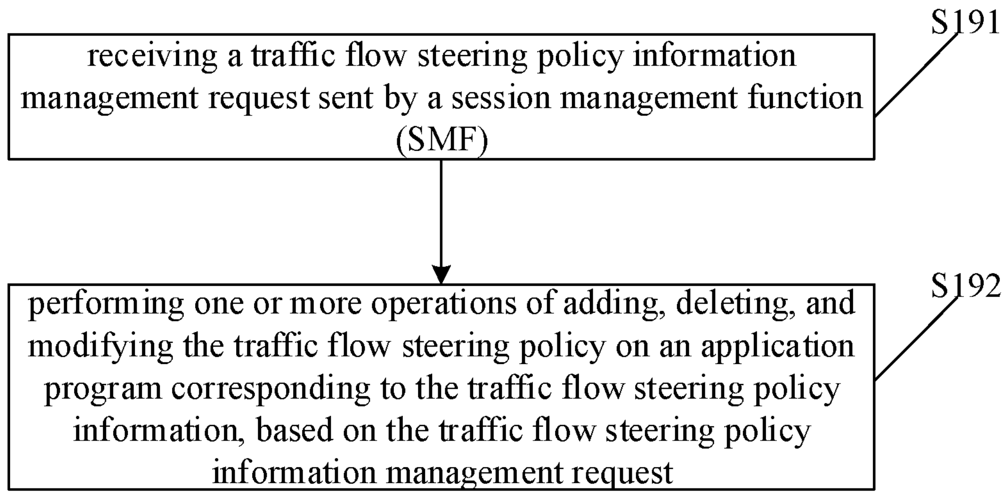
FIG. 25 is a flow chart showing a traffic flow processing method applied to a user plane function (UPF) network according to an illustrative embodiment.

FIG. 25 is a flow chart showing a traffic flow processing method according to an illustrative embodiment. As shown in FIG. 25, the method is applied to a user plane function (UPF) network element and includes steps as follows.

In step S191, a traffic flow steering policy information management request sent by a session management function (SMF) is received.

In step S192, one or more operations of adding, deleting, and modifying the traffic flow steering policy are performed on an application program corresponding to the traffic flow steering policy information, based on the traffic flow steering policy information management request.

In an embodiment of the present disclosure, the traffic flow steering policy information management request is configured to provide traffic flow steering policy information.

Figure 26:
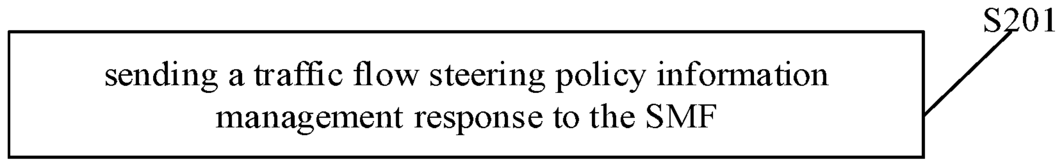
FIG. 26 is a flow chart showing a traffic flow processing method according to an illustrative embodiment.

FIG. 26 is a flow chart showing a traffic flow processing method according to an illustrative embodiment. As shown in FIG. 26, the method is applied to a user plane function (UPF) network element and includes a step as follows.

In step S201, a traffic flow steering policy information management response is sent to the SMF.

In an embodiment of the present disclosure, the traffic flow steering policy information management response is configured to indicate that a management operation confirmation has been performed on the traffic flow steering policy information.

Based on the same concept, an embodiment of the present disclosure also provides a traffic flow processing apparatus.

It may be understood that, in order to realize the above-mentioned functions, the traffic flow processing apparatus provided in the embodiment of the present disclosure includes corresponding hardware structures and/or software modules for executing various functions. Combining with units and algorithm steps of various examples disclosed in the embodiments of the present disclosure, the embodiments of the present disclosure may be implemented in the form of hardware or a combination of hardware and computer software. Whether a function is executed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 27:
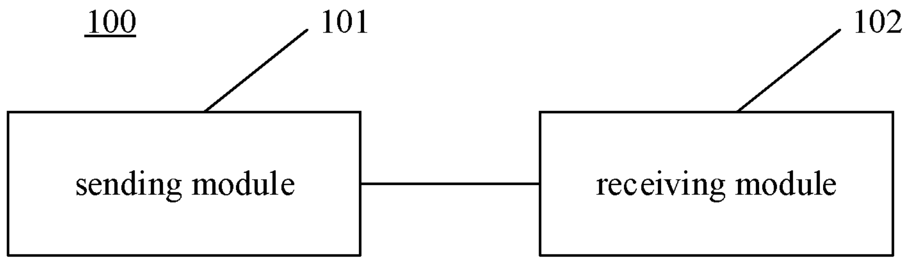
FIG. 27 is a schematic diagram showing a traffic flow processing apparatus applied to an AF network element according to an illustrative embodiment.

FIG. 27 is a schematic diagram showing a traffic flow processing apparatus according to an illustrative embodiment. Referring to FIG. 27, the apparatus 100 is applied to an application function (AF) network element, and includes a sending module 101.

The sending module 101 is configured to send a traffic flow steering policy request to a network exposure function (NEF). The traffic flow steering policy request is configured to provide traffic flow steering policy information.

In an embodiment of the present disclosure, the apparatus further includes a receiving module 102.

The receiving module 102 is configured to receive a traffic flow steering policy response sent by the NEF, in which the traffic flow steering policy response includes an application identifier corresponding to the traffic flow steering policy information, and the application identifier is configured for determining to store the traffic flow steering policy information in a unified data repository (UDR).

Figure 28:
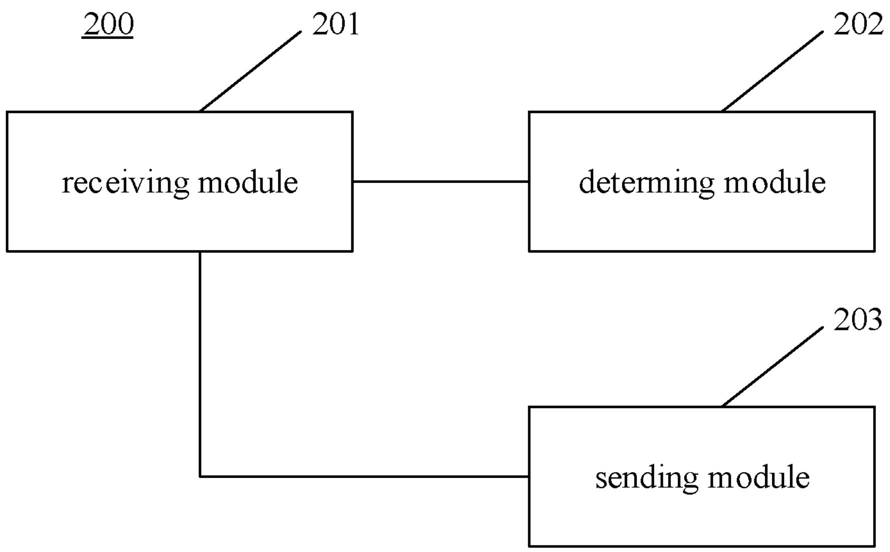
FIG. 28 is a schematic diagram showing a traffic flow processing apparatus applied to a NEF network element according to an illustrative embodiment.

FIG. 28 is a traffic flow processing apparatus according to an illustrative embodiment. Referring to FIG. 28, the apparatus 200 is applied to a network exposure function (NEF) network element, and includes a receiving module 201.

The receiving module 201 is configured to receive a traffic flow steering policy request sent by an application function (AF), in which the traffic flow steering policy request is configured for the AF to provide traffic flow steering policy information to the NEF.

In an embodiment of the present disclosure, after receiving the traffic flow steering policy request, the apparatus further includes a determining module 202.

The determining module 202 is configured to determine the traffic flow steering policy information in the traffic flow steering policy request.

In an embodiment of the present disclosure, the apparatus further includes a sending module 203.

The sending module 203 is configured to send a data storage request to a unified data repository (UDR), in which the data storage request is configured for requesting to store the traffic flow steering policy information in the UDR.

In an embodiment of the present disclosure, the receiving module 201 is configured to receive a data storage response sent by the UDR, in which the data storage response is configured to indicate that the traffic flow steering policy information is stored in the UDR.

In an embodiment of the present disclosure, the receiving module 201 is configured to receive a traffic flow steering policy information request sent by a session management function (SMF), in which the traffic flow steering policy information request is configured for the SMF to acquire the traffic flow steering policy information retrieved based on an application identifier from the NEF.

In an embodiment of the present disclosure, after receiving the traffic flow steering policy information request sent by the SMF, the sending module 203 is configured to send a traffic flow steering policy information acquisition request to the UDR, in which the traffic flow steering policy information acquisition request is configured to acquire the traffic flow steering policy information.

In an embodiment of the present disclosure, after sending the traffic flow steering policy information acquisition request to the UDR, the receiving module 201 is configured to receive traffic flow steering policy information sent by the UDR, in which the traffic flow steering policy information is the traffic flow steering policy information retrieved based on the application identifier.

In an embodiment of the present disclosure, after receiving the traffic flow steering policy information sent by the UDR, the sending module is configured to send traffic flow steering policy information to the SMF, in which the traffic flow steering policy information is the traffic flow steering policy information retrieved based on the application identifier.

Figure 29:
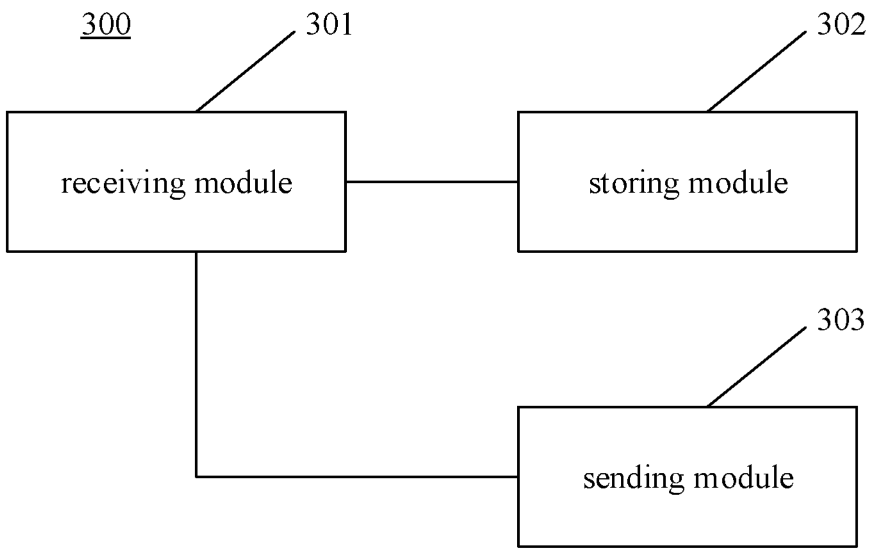
FIG. 29 is a schematic diagram showing a traffic flow processing apparatus applied to a UDR network element according to an illustrative embodiment.

FIG. 29 is a traffic flow processing apparatus according to an illustrative embodiment. Referring to FIG. 29, the apparatus 300 is applied to a unified data repository (UDR) network element, and includes a receiving module 301.

The receiving module 301 is configured to receive a data storage request sent by a network exposure function (NEF), in which the data storage request is configured for requesting to store traffic flow steering policy information in the UDR. A storage module 302 is configured to store the traffic flow steering policy information.

In an embodiment of the present disclosure, the apparatus further includes a sending module 303.

The sending module is configured to send a data storage response to the NEF, in which the data storage response is configured to indicate that the traffic flow steering policy information is stored in the UDR network element.

In an embodiment of the present disclosure, the receiving module 301 is configured to receive a traffic flow steering policy information acquisition request sent by the NEF, in which the traffic flow steering policy information acquisition request is configured to acquire the traffic flow steering policy information.

In an embodiment of the present disclosure, after receiving the traffic flow steering policy information acquisition request sent by the NEF, the sending module 303 is configured to send the traffic flow steering policy information to the NEF, in which the traffic flow steering policy information is traffic flow steering policy information retrieved based on an application identifier.

Figure 30:
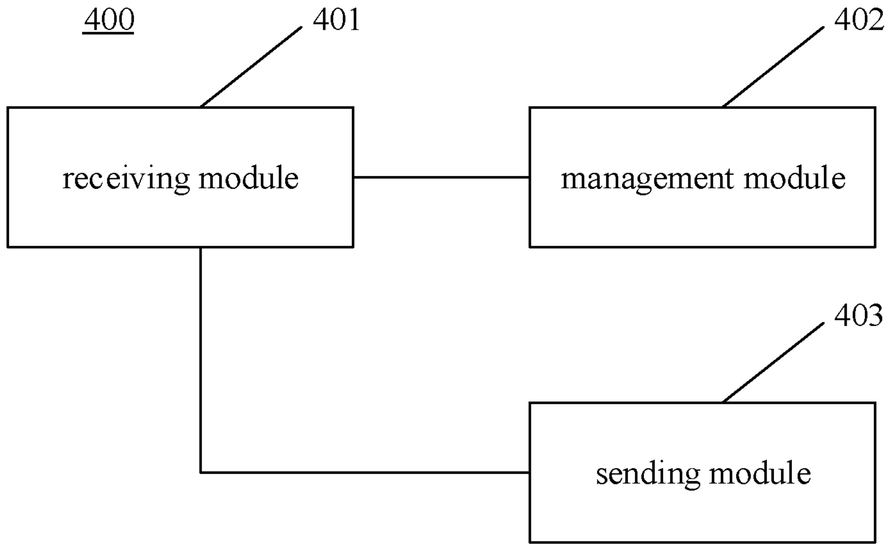
FIG. 30 is a schematic diagram showing a traffic flow processing apparatus applied to an SMF network element according to an illustrative embodiment.

FIG. 30 is a traffic flow processing apparatus according to an illustrative embodiment. Referring to FIG. 30, the apparatus 400 is applied to a session management function (SMF) network element, and includes a receiving module 401 and a management module 402.

The receiving module 401 is configured to receive traffic flow steering policy information sent by a network exposure function (NEF), in which the traffic flow steering policy information is traffic flow steering policy information retrieved based on an application identifier. The management module 402 is configured to perform one or more operations of adding, deleting, and modifying the traffic flow steering policy on an application program corresponding to the traffic flow steering policy information, based on the traffic flow steering policy information.

In an embodiment of the present disclosure, the apparatus further includes a sending module 403.

The sending module is configured to send a traffic flow steering policy information request to the NEF, in which the traffic flow steering policy information request is configured to acquire the traffic flow steering policy information retrieved based on the application identifier from the NEF.

In an embodiment of the present disclosure, a set of traffic flow steering policy information is sent in at least one of following cases: determining that a cache counter expires and a user plane function (UPF) has not applied the traffic flow steering policy information, the UPF having no traffic flow steering policy information, determining that the NEF has received a traffic flow steering policy request sent by an application function (AF).

In an embodiment of the present disclosure, the sending module 403 is configured to send a traffic flow steering strategy information management request to a user plane function (UPF). The traffic flow steering policy information management request is configured to provide the traffic flow steering policy information.

In an embodiment of the present disclosure, after sending the traffic flow steering policy information management request to the UPF, the receiving module is configured to receive a traffic flow steering policy information management response sent by the UPF, in which the traffic flow steering policy information management response is configured to indicate that a management operation confirmation has been performed on the traffic flow steering policy information.

Figure 31:
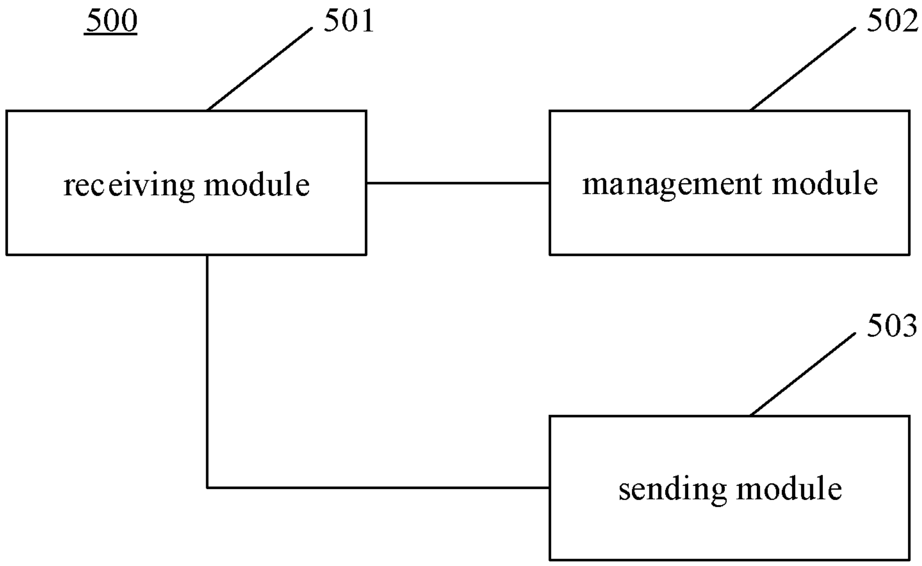
FIG. 31 is a schematic diagram showing a traffic flow processing apparatus applied to a UPF network element according to an illustrative embodiment.

FIG. 31 is a traffic flow processing apparatus according to an illustrative embodiment. Referring to FIG. 31, the apparatus 500 is applied to a user plane function (UPF) network element, and includes a receiving module 501.

The receiving module 501 is configured to receive a traffic flow steering policy information management request sent by a session management function (SMF), in which the traffic flow steering policy information management request is configured to provide traffic flow steering policy information.

The management module 502 is configured to perform one or more operations of adding, deleting, and modifying the traffic flow steering policy on an application program corresponding to the traffic flow steering policy information, based on the traffic flow steering policy information management request.

In an embodiment of the present disclosure, the apparatus further includes a sending module 503.

The sending module 503 is configured to send a traffic flow steering policy information management response to the SMF, in which the traffic flow steering policy information management response is configured to indicate that a management operation confirmation has been performed on the traffic flow steering policy information.

With respect to the apparatus in the above-mentioned embodiment, the specific manners for performing operations for individual modules therein have been described in detail in the embodiments regarding the method, which will not be elaborated herein.

The technical solution provided in the embodiment of the disclosure may include the following beneficial effects. By means of the present disclosure, a third party application sends the traffic flow steering policy request to the NEF through the AF, and requests to manage service functions and service function paths for its application. The traffic flow steering policy may be flexibly managed.

Figure 32:
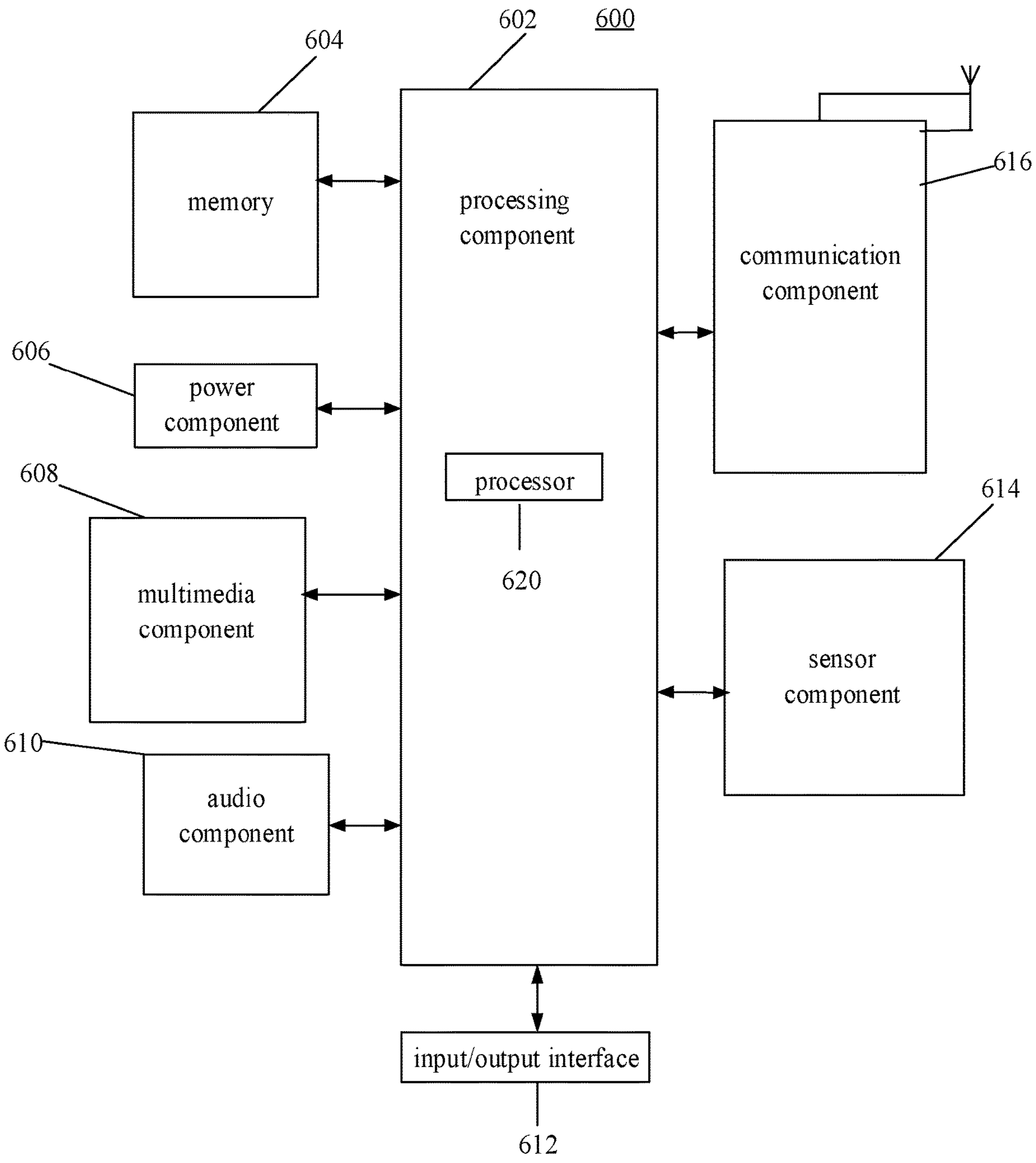
FIG. 32 is a block diagram showing a device for processing a traffic flow according to an illustrative embodiment.

FIG. 32 is a block diagram showing a device 600 for processing a traffic flow according to an illustrative embodiment. For example, the device 600 can be a mobile phone, a computer, a digital broadcast terminal, a messaging device, a game console, a tablet device, a medical device, a fitness device, a personal digital assistant, or the like.

Referring to FIG. 32, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, phone calls, data communications, camera operations, and recording operations. The processing component 602 can include one or more of processors 620 to execute instructions to perform all or some of the steps in the above-described methods. Moreover, the processing component 602 may include one or more of modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more of power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more of touch sensors to sense touches, swipes, and gestures on the touch panel. The touch sensors may not only sense a boundary of a touch or swipe action, but also sense a duration and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as keyboards, click wheels, buttons, and the like. The buttons may include, but are not limited to, a home button, a volume button, a starting button, and a locking button.

The sensor component 614 includes one or more of sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate communication, wired or wireless, between the device 600 and other devices. The device 600 can access a wireless network based on a communication standard, such as WiFi, 2G, or 3G, or a combination thereof. In an illustrative embodiment, the communication component 616 receives a broadcast signal or broadcast associated information from an external broadcast management system via a broadcast channel. In an illustrative embodiment, the communication component 616 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In an illustrative embodiment, the device 600 may be implemented with one or more of application specific integrated circuits (ASICs), a digital signal processor (DSP), a digital signal processing device (DSPD), a programmable logic device (PLD), a field programmable gate array (FPGA), a controller, a micro-controller, a microprocessor, or other electronic elements, for performing the above-mentioned method.

In an illustrative embodiment, there is also provided a non-transitory computer readable storage medium including instructions, such as included in the memory 604, executable by the processor 620 in the device 600, for completing the above-mentioned method. For example, the non-transitory computer-readable storage medium may be a ROM, a random access memory (RAM), a CD-ROM, a magnetic tape, a floppy disc, an optical data storage device, and the like.

Figure 33:
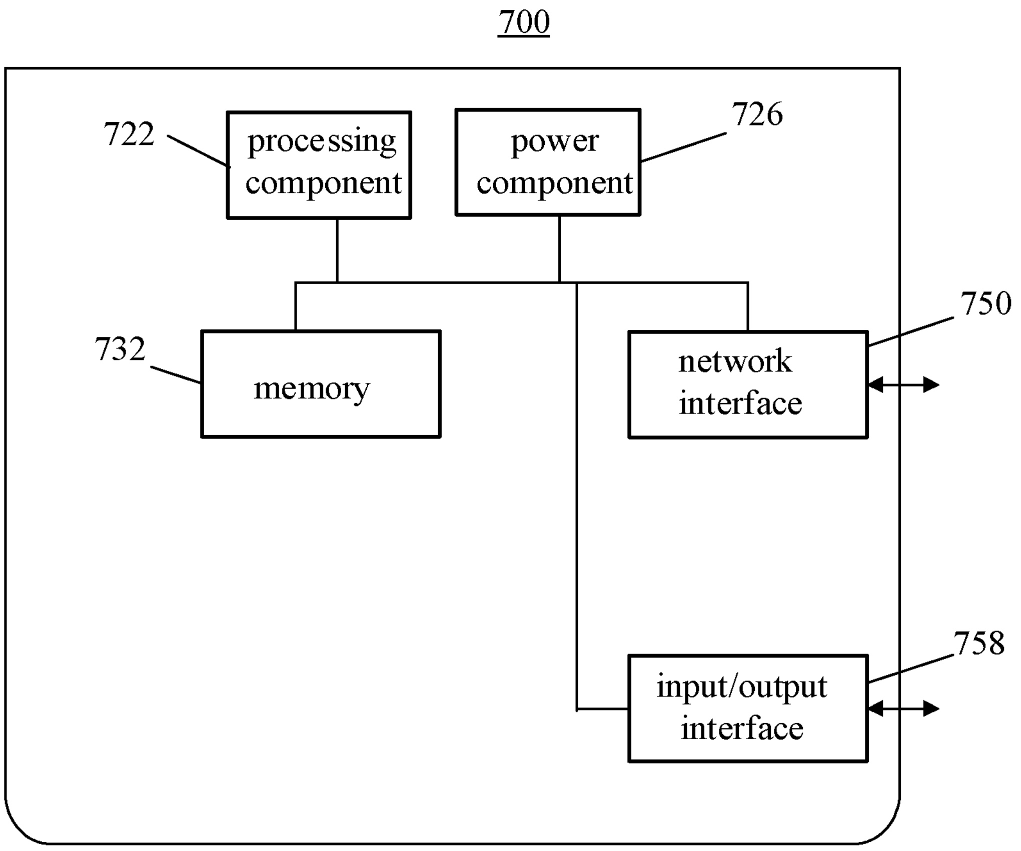
FIG. 33 is a block diagram showing a device for processing a traffic flow according to an illustrative embodiment.

FIG. 33 is a block diagram showing a device 700 for processing a traffic flow according to an illustrative embodiment. For example, the device 700 may be provided as a server. Referring to FIG. 33, the device 700 includes a processing component 722, which further includes one or more of processors, and memory resources represented by a memory 732 for storing instructions executable by the processing component 722, such as an application program. The application program stored in the memory 732 may include one or more modules each corresponding to a set of instructions. In addition, the processing component 722 is configured to execute instructions to perform the above-mentioned method.

The device 700 may further include a power component 726 configured to perform power management of the device 700, a wired or wireless network interface 750 configured to connect the device 700 to a network, and an input/output (I/O) interface 758. The device 700 may operate based on an operating system stored in the memory 732, such as Windows Server™, Mac OS X™, Unix™, Linux™, FreeBSD™, or the like.

It is further understood that "a plurality" in the present disclosure refers to two or more, and other quantifiers are similar thereto. "And/or", which describes an associated relationship of associated objects, means that there may be three relationships, for example, A and/or B, which may mean that A exists alone, A and B exist at the same time, and B exists alone. A character "/" generally indicates that contextual objects are in an "or" relationship. "A/an" and "the" in singular forms are intended to include plural forms, unless clearly indicated in the context otherwise.

It is further understood that terms such as "first", and "second" are used to describe various information, these information should not be limited by these terms. These terms are only used for distinguishing information of the same type from each other and do not denote a particular order or degree of importance. As a matter of fact, the terms such as "first", and "second" may be used interchangeably. For example, first information may also be referred to as second information, and similarly, the second information may also be referred to as the first information, without departing from the scope of embodiments of the present disclosure.

It is further understood that although operations are described in a specific order in the accompanying drawings in the embodiments of the present disclosure, it should not be understood that these operations are required to be performed in the specific order shown or in a serial order, or that all of the operations shown are required to be performed to obtain desired results. In certain circumstances, multitasking and parallel processing may be advantageous.

It may be further understood that the methods described in the embodiments of the present disclosure may be executed independently or in a combined manner, which is not limited in the present disclosure.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A traffic flow processing device, comprising:

a processor; and a memory for storing instructions executable by the processor;

wherein the processor is configured:

send, by an application function (AF) network element, a traffic flow steering policy request to a network exposure function (NEF); wherein the traffic flow steering policy request is configured to provide traffic flow steering policy information, and the traffic flow steering policy information in the traffic flow steering policy request is determined by the NEF;

send, by the NEF, a data storage request to a unified data repository (UDR), wherein the data storage request is configured for requesting to store the traffic flow steering policy information in the UDR, wherein the UDR storing the traffic flow steering policy information comprises one or more operations of adding, deleting, and modifying;

send, by the UDR, a data storage response to the NEF, wherein the data storage response is configured to indicate that the traffic flow steering policy information is stored in the UDR network element;

send, by the NEF, a traffic flow steering policy response to the AF, wherein the traffic flow steering policy response comprises an application identifier corresponding to the traffic flow steering policy information, and the application identifier is configured for determining to store the traffic flow steering policy information in the UDR; and receive, by the NEF, a set of traffic flow steering policy information sent by a session management function (SMF) network element, wherein the SMF network element sends the set of traffic flow steering policy information in the following cases:

determining that a cache counter expires and a user plane function (UPF) has not applied the traffic flow steering policy information;

the UPF having no traffic flow steering policy information; and determining that the NEF has received a traffic flow steering policy request sent by an application function (AF).

2. The traffic flow processing device of claim 1, wherein the processor is configured to:

receive a traffic flow steering policy information request sent by a session management function (SMF), wherein the traffic flow steering policy information request is configured for the SMF to acquire the traffic flow steering policy information retrieved based on an application identifier from the NEF.

3. A traffic flow processing method, comprising:

sending, by an application function (AF) network element, a traffic flow steering policy request to a network exposure function (NEF); wherein the traffic flow steering policy request is configured to provide traffic flow steering policy information, and the traffic flow steering policy information in the traffic flow steering policy request is determined by the NEF;

sending, by the NEF, a data storage request to a unified data repository (UDR), wherein the data storage request is configured for requesting to store the traffic flow steering policy information in the UDR, wherein the UDR storing the traffic flow steering policy information comprises one or more operations of adding, deleting, and modifying;

sending, by the UDR, a data storage response to the NEF, wherein the data storage response is configured to indicate that the traffic flow steering policy information is stored in the UDR network element;

sending, by the NEF, a traffic flow steering policy response to the AF, wherein the traffic flow steering policy response comprises an application identifier corresponding to the traffic flow steering policy information, and the application identifier is configured for determining to store the traffic flow steering policy information in the UDR; and receiving, by the NEF, a set of traffic flow steering policy information sent by a session management function (SMF) network element, wherein the SMF network element sends the set of traffic flow steering policy information in the following cases:

determining that a cache counter expires and a user plane function (UPF) has not applied the traffic flow steering policy information;

the UPF having no traffic flow steering policy information; and determining that the NEF has received a traffic flow steering policy request sent by an application function (AF).

4. The traffic flow processing method of claim 3, further comprising:

receiving, by the NEF, a traffic flow steering policy information request sent by the SMF, wherein the traffic flow steering policy information request is configured for the SMF to acquire the traffic flow steering policy information retrieved based on an application identifier from the NEF;

sending, by the NEF, a traffic flow steering policy information acquisition request to the UDR, wherein the traffic flow steering policy information acquisition request is configured to acquire the traffic flow steering policy information;

receiving, by the NEF, traffic flow steering policy information sent by the UDR, wherein the traffic flow steering policy information is the traffic flow steering policy information retrieved based on the application identifier;

sending, by the NEF, traffic flow steering policy information to the SMF, wherein the traffic flow steering policy information is the traffic flow steering policy information retrieved based on the application identifier.

5. A traffic flow processing system, comprising:

an application function (AF) network element configured to send a traffic flow steering policy request to a network exposure function (NEF) network element, wherein the traffic flow steering policy request is configured to provide traffic flow steering policy information;

the NEF network element configured to:

receive the traffic flow steering policy request sent by the AF network element;

determine the traffic flow steering policy information in the traffic flow steering policy request;

send a data storage request to a unified data repository (UDR) network element, wherein the data storage request is configured for requesting to store the traffic flow steering policy information in the UDR network element, wherein the UDR network element storing the traffic flow steering policy information comprises one or more operations of adding, deleting, and modifying;

receive a data storage response sent by the UDR network element, wherein the data storage response is configured to indicate that the traffic flow steering policy information is stored in the UDR network element;

send a traffic flow steering policy response to the AF network element, wherein the traffic flow steering policy response comprises an application identifier corresponding to the traffic flow steering policy information, and the application identifier is configured for determining to store the traffic flow steering policy information in the UDR network element; and receive a set of traffic flow steering policy information sent by a session management function (SMF) network element;

the UDR network element configured to receive the data storage request, store the traffic flow steering policy information, and send the data storage response to the NEF network element; and the SMF network element configured to send the set of traffic flow steering policy information to the NEF network element in the following cases:

determining that a cache counter expires and a user plane function (UPF) has not applied the traffic flow steering policy information;

the UPF having no traffic flow steering policy information; and determining that the NEF network element has received the traffic flow steering policy request sent by the AF network element.

6. The traffic flow processing system of claim 5, the NEF network element further configured to:

receive a traffic flow steering policy information request sent by a session management function (SMF), wherein the traffic flow steering policy information request is configured for the SMF to acquire the traffic flow steering policy information retrieved based on an application identifier from the NEF.

7. The traffic flow processing system of claim 6, wherein after receiving the traffic flow steering policy information request sent by the SMF, the NEF network element further configured to: send a traffic flow steering policy information acquisition request to the UDR, wherein the traffic flow steering policy information acquisition request is configured to acquire the traffic flow steering policy information.

8. The traffic flow processing system of claim 7, wherein after sending the traffic flow steering policy information acquisition request to the UDR, the NEF network element further configured to:

receive traffic flow steering policy information sent by the UDR, wherein the traffic flow steering policy information is the traffic flow steering policy information retrieved based on the application identifier.

9. The traffic flow processing system of claim 8, wherein after receiving the traffic flow steering policy information sent by the UDR, the NEF network element further configured to:

send traffic flow steering policy information to the SMF, wherein the traffic flow steering policy information is the traffic flow steering policy information retrieved based on the application identifier.

10. The traffic flow processing system of claim 5, the SMF network element configured to:

send a traffic flow steering policy information management request to the UPF; wherein the traffic flow steering policy information management request is configured to provide the traffic flow steering policy information.

11. The traffic flow processing system of claim 10, wherein after sending the traffic flow steering policy information management request to the UPF, the SMF network element configured to:

receive a traffic flow steering policy information management response sent by the UPF, wherein the traffic flow steering policy information management response is configured to indicate that a management operation confirmation has been performed on the traffic flow steering policy information.

12. The traffic flow processing system of claim 5, wherein, when a caching timer for an application identifier expires and a policy and charging control (PCC) rule for the application identifier is still active, the SMF retrieves the traffic flow steering policy information from the NEF; and the NEF retrieves the traffic flow steering policy information from the UDR unless already available in the NEF.

* * * * *